United States Patent
Bastide et al.

(10) Patent No.: US 10,425,364 B2
(45) Date of Patent: Sep. 24, 2019

(54) DYNAMIC CONVERSATION MANAGEMENT BASED ON MESSAGE CONTEXT

(71) Applicant: International Business Machines Corporation, Armonk, NY (US)

(72) Inventors: Paul R. Bastide, Boxford, MA (US); Sathyanarayanan Srinivasan, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/632,801

(22) Filed: Jun. 26, 2017

(65) Prior Publication Data
US 2018/0375803 A1  Dec. 27, 2018

(51) Int. Cl.
*G06F 17/27* (2006.01)
*G06F 17/28* (2006.01)
*H04L 12/58* (2006.01)

(52) U.S. Cl.
CPC .......... *H04L 51/02* (2013.01); *G06F 17/2775* (2013.01); *G06F 17/2836* (2013.01)

(58) Field of Classification Search
CPC ........... G06F 17/20; G06F 17/22; G06F 17/27
See application file for complete search history.

(56) References Cited

U.S. PATENT DOCUMENTS

| | | | |
|---|---|---|---|
| 6,775,689 B1 * | 8/2004 | Raghunandan | G06Q 10/107 709/204 |
| 7,765,212 B2 | 7/2010 | Surendran et al. | |
| 7,890,593 B2 * | 2/2011 | Chen | G06Q 10/107 709/206 |
| 8,392,409 B1 | 3/2013 | Kashyap et al. | |
| 8,510,664 B2 | 8/2013 | Rueben et al. | |
| 8,918,468 B1 * | 12/2014 | Fisher | H04M 3/5191 705/319 |
| 9,043,413 B2 | 5/2015 | Kraft et al. | |
| 9,330,145 B2 * | 5/2016 | Satyanarayanan | G06Q 30/016 |
| 2005/0149621 A1 * | 7/2005 | Kirkland | H04L 51/04 709/207 |

(Continued)

OTHER PUBLICATIONS

SaneBox for Business, https://www.sanebox.com/business, SaneBox, Inc., 2017, 4 pages.

(Continued)

*Primary Examiner* — Paras D Shah
(74) *Attorney, Agent, or Firm* — L. Jeffrey Kelly; Edell, Shapiro & Finnan, LLC

(57) ABSTRACT

According to an embodiment of the present invention, a system dynamically processes an incoming message. Initially, a system receives a message including a plurality of different contexts. In response to receiving the message, a processor in the system partitions the message into a plurality of sections each associated with a corresponding context, wherein each context includes an inquiry to receive a reply. The processor further generates one or more replies for a corresponding context and generates a response to the message including the sections and the one or more replies, wherein each reply is inserted into a section in the response associated with the corresponding context. Embodiments of the present invention further include a method and computer program product for dynamically processing messages in substantially the same manner described above.

20 Claims, 9 Drawing Sheets

(56) References Cited

U.S. PATENT DOCUMENTS

| | | | | |
|---|---|---|---|---|
| 2009/0076795 A1* | 3/2009 | Bangalore | ........... | G06F 17/2785 704/9 |
| 2009/0106375 A1* | 4/2009 | Carmel | ............... | G06F 17/2211 709/206 |
| 2009/0144636 A1* | 6/2009 | Beynon | ................. | G06F 17/211 715/752 |
| 2009/0164888 A1 | 6/2009 | Phan | | |
| 2009/0282114 A1* | 11/2009 | Feng | .................... | G06Q 10/107 709/206 |
| 2009/0282493 A1* | 11/2009 | Bhide | ................... | H04L 63/105 726/28 |
| 2010/0100845 A1* | 4/2010 | Khan | ................ | G06F 17/30867 715/810 |
| 2010/0211644 A1* | 8/2010 | Lavoie | ................ | G06Q 10/107 709/206 |
| 2014/0310365 A1* | 10/2014 | Sample | ................... | H04L 51/16 709/206 |
| 2016/0021052 A1 | 1/2016 | Bastide et al. | | |
| 2016/0119265 A1* | 4/2016 | Akavaram | ........... | G06Q 10/107 709/206 |
| 2016/0182417 A1* | 6/2016 | Cordes | .................... | H04L 51/08 709/206 |
| 2017/0180291 A1* | 6/2017 | Wolfram | .................. | H04L 51/12 |
| 2017/0346774 A1* | 11/2017 | Akavaram | .......... | G06F 17/2785 |
| 2018/0039621 A1* | 2/2018 | Scronce | ............. | G06F 3/04817 |

OTHER PUBLICATIONS

Rohall et al., "Email Visualizations to Aid Communications", Proceedings of InfoVis 2001, The IEEE Symposium on Information Visualization, IEEE, vol. 12, 2001, 4 pages.

Freed et al., "RADAR: A Personal Assistant that Learns to Reduce Email Overload", Association for the Advancement of Artificial Intelligence, 2008, pp. 15-21.

Carvalho et al., "Improving email speech acts analysis via n-gram selection." Proceedings of the HLT-NAACL 2006 Workshop on Analyzing Conversations in Text and Speech. Association for Computational Linguistics, 2006, pp. 35-41.

\* cited by examiner

DYNAMIC CONVERSATION MANAGEMENT BASED ON MESSAGE CONTEXT

BACKGROUND

1. Technical Field

Present invention embodiments relate to messaging systems, and more specifically, to dynamic message threading based on message context.

2. Discussion of the Related Art

Smartphone users receive numerous messages of various contexts. For example, text Messaging, Instant Messaging, Mail Clients and Online Social Networks are the universal mechanisms through which people connect and share information. These mechanisms enable users to read and respond to countless messages every day, where each message may contain multiple contexts within a single communication (e.g., questions, comments, exclamations, updates, etc.). Due to the large number of contexts associated with the received messages, however, contexts associated with the incoming messages are often misinterpreted or missed entirely by the receiver of the messages.

SUMMARY

According to an embodiment of the present invention, a system dynamically processes an incoming message. Initially, a system receives a message including a plurality of different contexts. In response to receiving the message, a processor in the system partitions the message into a plurality of sections each associated with a corresponding context, wherein each context includes an inquiry to receive a reply. The processor further generates one or more replies for a corresponding context and generates a response to the message including the sections and the one or more replies, wherein each reply is inserted into a section in the response associated with the corresponding context. Embodiments of the present invention further include a method and computer program product for dynamically processing messages in substantially the same manner described above.

DETAILED DESCRIPTION

Present invention embodiments dynamically capture and process an incoming message directed to a user device. Initially, a server receives and analyzes an incoming message to determine, based on a message context of the incoming message, whether to partition the incoming message before forwarding it to a user device for display to a user. A processor in the server uses Natural Language Processing (NLP) techniques to identify one or more message contexts associated with the incoming message and, based on the one or more message contexts, partitions the incoming message into one or more message threads that are associated with one of the one or more message contexts identified in the incoming message. The processor may further identify one or more additional messages in each of the one or more message threads and display at least one of the message threads on a user device. In this fashion, a user may readily identify an incoming message thread as being related to one or more additional messages that belong to a corresponding message thread (i.e., grouped within the same message thread).

Analysis techniques may further highlight an incoming message into pre-configured colors to convey or indicate a message context and/or sentiment of a message thread based on the message content of the incoming message and one or more additional messages comprising the message thread. For example, a message context processor may indicate that an incoming message is part of a critical message thread by making the background color of the message thread red, indicating to a user that the message thread is of critical importance and/or is of a sensitive nature. A message context processor may further construct a message thread, based on the message content of an incoming message and one or more previously received messages, to include one or more objects and/or symbols to convey or indicate that the incoming message is related to the one or more previously received messages. For example, an incoming message thread may be modified to include a smiling emoticon or a picture of someone laughing to convey a positive or happy message sentiment and/or response associated with one or more previous messages in a corresponding message thread.

Figure 1:
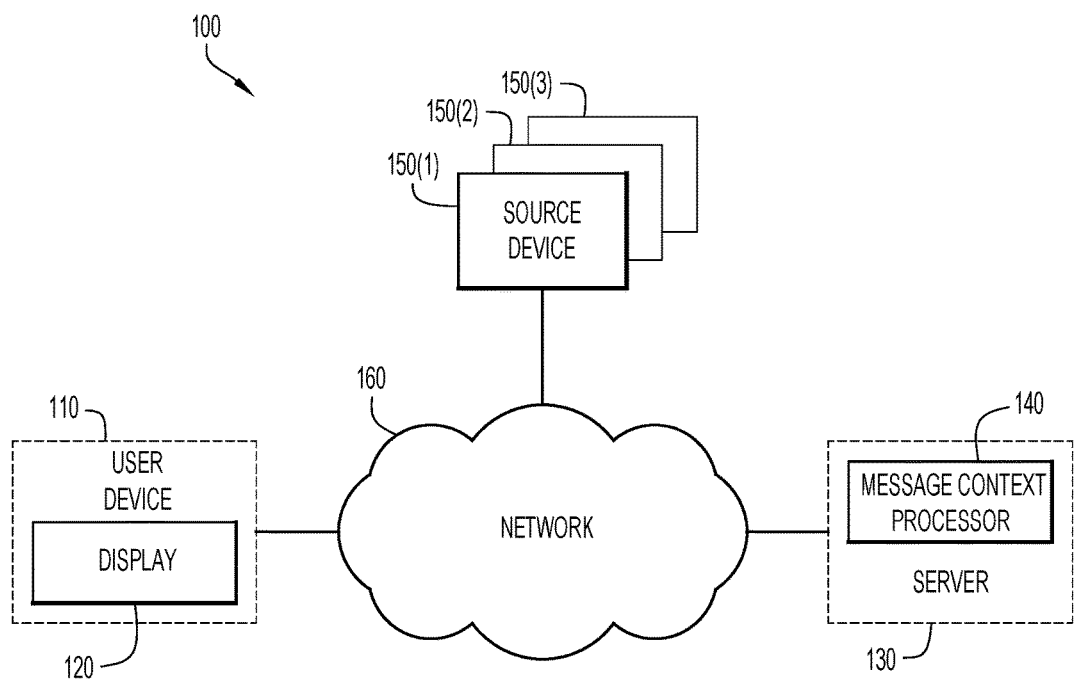
FIG. 1 is a diagrammatic illustration of an example computing environment for use with an embodiment of the present invention.

An example computing environment for use with present invention embodiments is illustrated in FIG. 1. Specifically, environment 100 includes a user device 110, one or more servers 130, and one or more source devices 150. User device 110 may comprise one or more displays 120 for displaying one or more message threads identified by server 130. Server 130 may comprise one or more message context processors 140, which are responsible for identifying and highlighting one or more message threads based on one or more contexts associated with one or more incoming messages for display on user device 110. Server 130 and user device 110 may be remote from each other and communicate over a network 160. Network 160 may be implemented by any number of any suitable communications media (e.g., wide area network (WAN), local area network (LAN), Internet, Intranet, etc.). Alternatively, server 130 and user device 110 may be local to each other, and communicate via any appropriate local communication medium (e.g., local area network (LAN), hardwire, wireless link, Intranet, etc.).

User device 110 enables users to receive one or more message threads based on one or more messages received at server 130. For example, server 130 may receive a single message comprising a plurality of message contexts and, in response, may partition the single message into a plurality of message threads to indicate one or more contexts associated with each of the message threads and may further highlight and/or color each of the message threads to visually separate the one or more contexts before forwarding the plurality of message threads to device 110 for display to a user associated with user device 110. According to a present invention embodiment, a user may request to receive an unmodified incoming message received from server 130 in response to receiving a message notification indicating receipt of the incoming message.

Initially, server 130 receives an incoming message from source device 150 (e.g., another user device or server generating a message, e.g., text, chat, social network, etc.) that is directed to a user associated with user device 110. After receiving the incoming message from source device 150, server 130 stores the incoming message and forwards it to message context processor 140. Message context processor 140, using NLP techniques, analyzes the message to determine a message content and/or message sentiment associated with the incoming message. For example, context processor 140 may use Alchemy Application Programming Interface (API) or Watson Developer Cloud cloud-based services to perform NLP analytics and contextual analysis to determine a message content of an incoming message, and may further use IBM's Watson Message Sentiment services to perform sentiment analysis to determine the sentiment or mood of an incoming message.

After analyzing the incoming message, server 130 may highlight one or more message threads included within the incoming message based on a message content, context and/or message sentiment associated with each of the one or more message threads. Server 130 may further highlight each of the message threads by selecting a pre-configured template based on the message content of each of the message threads. For example, server 130 may receive a medical-related message directed to the user, and based on the message content and message sentiment determined by message context processor 140, select a pre-configured template indicating that a message thread is medical-related. For each of the message threads identified in an incoming message, server 130 may further associate and/or group the message threads with one or more previously received messages, enabling a user to visually identify individual message threads associated with one or more on-going conversations.

Figure 2:
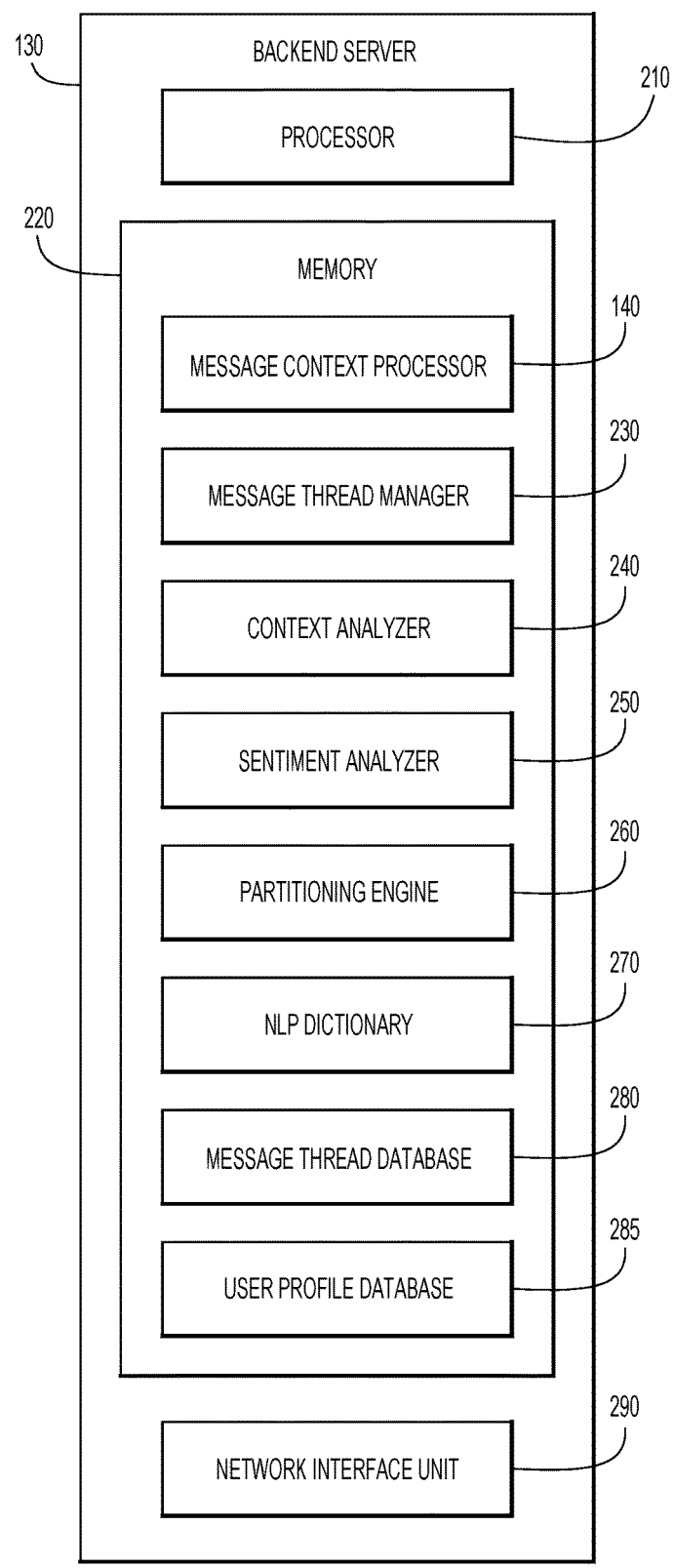
FIG. 2 is a block diagram illustrating the server of FIG. 1 in more detail according to an embodiment of the present invention.

Reference is now made to FIG. 2, which shows an example block diagram of server 130 configured to perform message processing according to present invention embodiments. It should be understood that there are numerous possible configurations for server 130 and FIG. 2 is meant to be an example of one of the possible configurations. Server 130 includes a processor 210, memory 220 and a network interface unit 290. The network interface (I/F) unit (NIU) 290 is, for example, an Ethernet card or other interface device that allows the server 130 to communicate over communication network 160. Network I/F unit 290 may include wired and/or wireless connection capabilities.

Processor 210 may include a collection of microcontrollers and/or microprocessors, for example, each configured to execute respective software instructions stored in the memory 220. Portions of memory 220 (and the instructions therein) may be integrated with processor 210.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 220 may comprise one or more computer readable storage media (e.g., a memory device) encoded with software comprising computer executable instructions and when the software is executed (e.g., by processor 210) it is operable to perform the operations described herein. For example, memory 220 stores or is encoded with instructions or modules for message context processor 140, which is configured to analyze one or more incoming messages to determine whether the one or more messages should be partitioned into one or more message threads before being forwarded to user device 110 for display to a user. Optionally, user device 110 and/or server 130 may, individually or in combination, include message context processor 140 to perform the message analysis to determine whether one or more messages should be partitioned according to the subjective preferences of the user associated with user device 110.

Memory 220 may further store or is encoded with instructions for message thread manager 230, context analyzer 240, sentiment analyzer 250, partitioning engine 260, NLP dictionary 270, message thread database 280, and user profile database 285. Message thread manager 230 is further configured to send one or more requests to user device 110 for user profile information, including one or more characteristics or preferences associated with a user of user device 110, one or more environmental parameters associated with user device 110 and/or feedback information associated with one or more partitioned messages previously sent to user device 110. Message thread manager 230 may store the received user profile information in user profile database 285 for message processing operations.

Context analyzer 240 may use NLP techniques to parse an incoming message comprising one or more message contexts to determine the contextual meaning associated with each of the one or more message contexts included in the incoming message. For example, if server 130 receives an incoming message of "Hi John! How are you? How was the kayaking trip? Is Amy doing fine? I heard they are having a sale at the store, would you guys like to join?" contextual analyzer 240 may determine that the incoming message comprises distinct message contexts. Specifically, contextual analyzer 240 may identify that "Hi John! How are you?" is a greeting to a user associated with client device 110. Similarly, contextual analyzer 240 may further identify that "How was the kayaking trip?" is an inquiry concerning a recent vacation and "Is Amy doing fine?" is an inquiry about Amy's health and/or welfare. Finally, contextual analyzer 240 may determine that "I heard they are having a sale at the store, would you guys like to join?" is an inquiry concerning a potential shopping trip to a retail store.

Sentiment analyzer 250 may analyze the message contexts determined by context analyzer 240 to identify a primary sentiment and/or mood associated with each of the message contexts included in an incoming message. For example, if context analyzer 240 determines that the context associated with "Is Amy doing fine?" is an inquiry about Amy's health and/or welfare, sentiment analyzer 250 may determine that the primary sentiment or mood associated with the message context is a one of empathy that is possibly of a sensitive nature.

Partitioning engine 260 determines whether one or more message contexts associated with an incoming message should be partitioned into distinct message threads. According to an embodiment of the present invention, this determination may be based on the message content and/or message sentiment associated with each of the message contexts identified in the incoming message by context analyzer 240 and/or sentiment analyzer 250, as well as pre-configured characteristics or preferences associated with the user receiving the message. If it is determined that the incoming message should be partitioned, partitioning engine 260 is further configured to generate a plurality of message threads based on related message contexts and/or sentiments identified in the incoming message. According to a present invention embodiment, partitioning engine 260 may further partition an incoming message into one or more message threads based on a proximity between two or more phrases within the incoming message. For example, if an incoming message is "Hi John! How are you? How was the kayaking trip? Is Amy doing fine? I heard they are having a sale at the store, would you guys like to join?" partitioning engine 260 may generate the message threads, "Hi John! How are you"; "How was the kayaking trip? Is Amy doing fine?"; and "I heard they are having a sale at the store, would you guys like to join?" Partitioning engine 260 may be further configured to include one or more symbols, e.g., emoticons, and/or a background color, in one or more message threads, based on a message context and/or sentiment associated with the one or more message contexts, to highlight and/or indicate the message context and/or sentiment associated with the one or more message threads.

Message thread manager 230, context analyzer 240, sentiment analyzer 250 and partitioning engine 260 may include one or more modules and/or units to perform the various functions of present invention embodiments described below. The various modules (e.g., message thread manager, context analyzer, sentiment analyzer, partitioning engine, etc.) may be implemented by any combination of any quantity of software and/or hardware modules or units, and may reside within memory 220 of server 130 for execution by processor 210.

Memory 220 may provide NLP dictionary 270, which may comprise one or more dictionaries that store various terms and meanings used and received by context analyzer 240 for contextual analysis of a message associated with a user of user device 110. For example, NLP dictionary 270 may store one or more definitions and/or synonyms associated within one or more words, terms and/or phrases included in the incoming message. Message thread manager 230 and/or context analyzer 240 may update one or more definitions and/or synonyms based on feedback information received from a user associated with user device 110. NLP dictionary 270 may be implemented by any conventional or other database or storage unit, may be local to or remote from server 130, and may communicate via any appropriate communication medium (e.g., local area network (LAN), wide area network (WAN), Internet, hardwire, wireless link, Intranet, etc.).

Memory 220 may also provide message thread database 280, which may store partitioned messages directed to a user associated with client device 110. For example, message thread database 280 may store one or more message threads included in one or more previously received messages to facilitate highlighting and/or responding to on-going message threads. Message thread database 280 may be implemented by any conventional or other database or storage unit, may be local to or remote from server 130, and may communicate via any appropriate communication medium (e.g., local area network (LAN), wide area network (WAN), Internet, hardwire, wireless link, Intranet, etc.).

Memory 220 may further provide user profile database 285, which may store various information used and received by message thread manager 230 for contextual analysis of a message associated with a user of user device 110. For example, user profile database 285 may store one or more preferences and/or configuration information associated with a user (e.g., security preferences, personal sensitivity, etc.). According to an embodiment of the present invention, one or more message threads may be generated from an incoming message based on the preferences and/or configuration information stored in user profile database 285. User profile database 285 may be implemented by any conventional or other database or storage unit, may be local to or remote from server 130, and may communicate via any appropriate communication medium (e.g., local area network (LAN), wide area network (WAN), Internet, hardwire, wireless link, Intranet, etc.).

Server 130 may be implemented by any conventional or other computer systems preferably equipped with a display or monitor, a base (e.g., including at least one processor 210, one or more memories 220 and/or internal or external network interfaces or communications devices 290 (e.g., modem, network cards, etc.), optional input devices (e.g., a keyboard, mouse or other input device), and any commercially available and custom software (e.g., server/communications software, message context processor, etc.).

Figure 3:
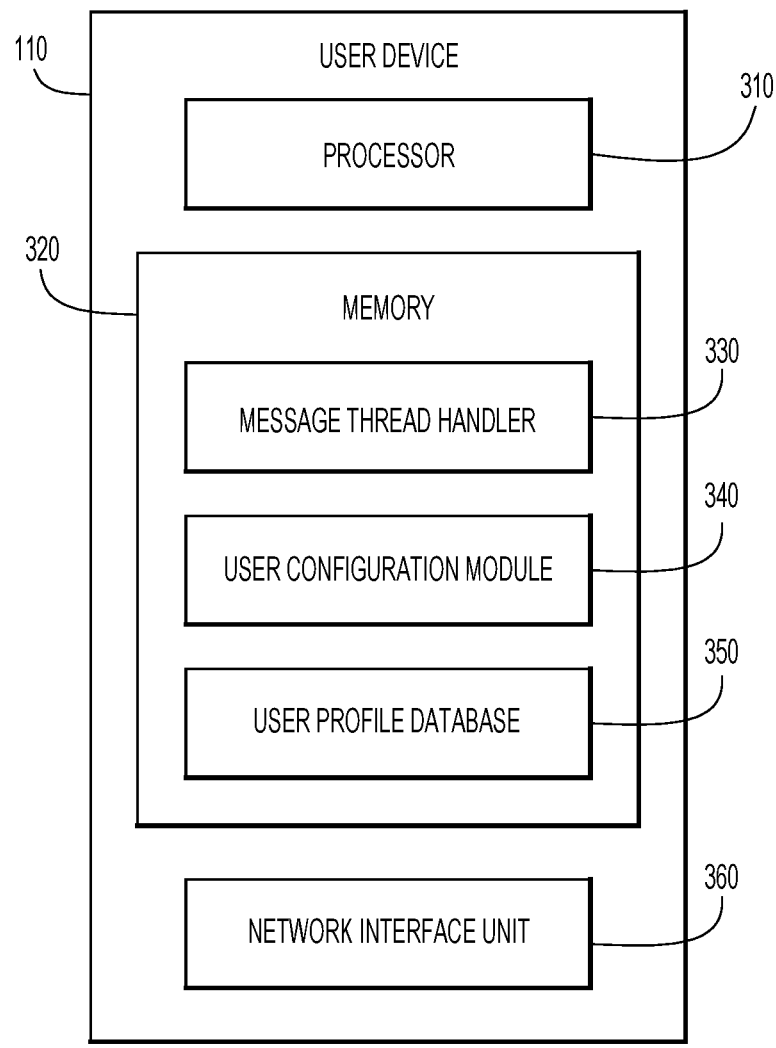
FIG. 3 is a block diagram illustrating the user device of FIG. 1 in more detail according to an embodiment of the present invention.

Reference is now made to FIG. 3, which shows an example block diagram of a user device 110 configured to receive, send and display a plurality of partitioned messages according to present invention embodiments. It should be understood that there are numerous possible configurations for user device 110 and FIG. 3 is meant to be an example of one of the possible configurations. User device 110 includes a processor 310, memory 320 and a network interface unit 360. The network interface (I/F) unit (NIU) 360 is, for example, an Ethernet card or other interface device that allows user device 110 to communicate over communication network 160. Network I/F unit 360 may include wired and/or wireless connection capabilities.

Processor 310 may include a collection of microcontrollers and/or microprocessors, for example, each configured to execute respective software instructions stored in the memory 320. Memory 320 may include various modules for execution by processor 310, including message thread handler 330, user configuration module 340, and user profile database 350. Portions of memory 320 (and the instructions or modules therein) may be integrated with processor 310.

Memory 320 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 320 may comprise one or more computer readable storage media (e.g., a memory device) encoded with software comprising computer executable instructions and when the software is executed (e.g., by processor 310) it is operable to perform the operations described herein. For example, memory 320 stores or is encoded with instructions for message thread handler 330 to perform overall control of the receiving and displaying operations of partitioned message threads described herein by receiving one or more inputs from multiple components, including user configuration module 340 and user profile database 350. Message thread handler 330 is further configured to send one or more user configuration parameters and/or preferences and one or more environmental parameters to server 130 to enable server 130 to determine, based on the received parameters and/or preferences, whether to partition an incoming message into a plurality of message threads prior to sending an incoming message to message thread handler 330 for display on user device 110.

User configuration module 340 is configured to allow a user to set one or more security parameters and/or user preferences associated with the user and related to the display of message threads on user device 110. Accordingly, user configuration module 340 allows a user to set one or more preferences and/or requirements at various levels, such that incoming message threads may be partitioned in accordance with the user's preferences and/or requirements. It should be understood that user configuration module 340 may use any input device and/or graphical user interface (GUI) to receive one or more security parameters and/or user preferences from a user associated with user device 110. For example, user configuration module 340 may display a slider-based GUI to a user associated with user device 110, allowing the user to vary one or more parameters and/or user preferences based on the position of an arrow, cursor or other indicator within the corresponding slider-based GUI.

Message thread handler 330 and user configuration module 340 may include one or more modules or units to perform the various functions of present invention embodiments described below. The various modules (e.g., message handler, user configuration module, etc.) may be implemented by any combination of any quantity of software and/or hardware modules or units, and may reside within memory 320 of user device 110 for execution by processor 310.

Memory 320 may further provide user profile database 350, which stores various information used and generated by message thread handler 330 for displaying one or more message threads received from server 130 on user device 110. For example, user profile database 350 may store one or more characteristics or preferences associated with a user (e.g., display preferences, security preferences, etc.). User profile database 350 may be implemented by any conventional or other database or storage unit, may be local to or remote from server 130, and may communicate via any appropriate communication medium (e.g., local area network (LAN), wide area network (WAN), Internet, hardwire, wireless link, Intranet, etc.).

Figure 4:
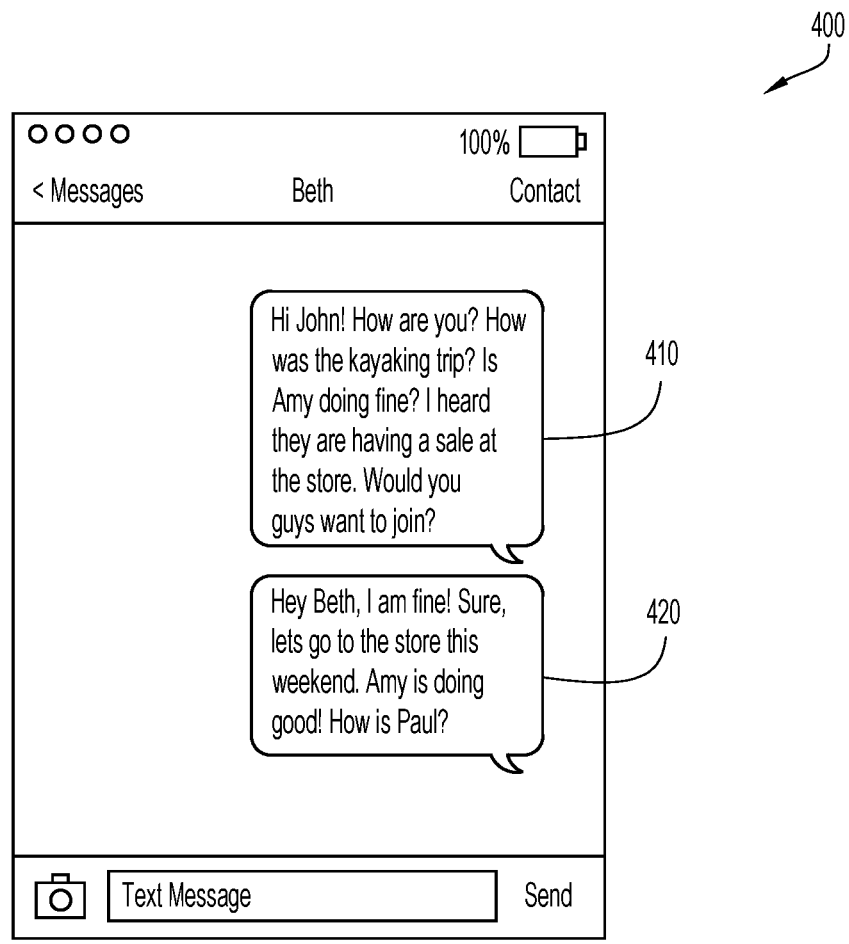
FIG. 4 is a diagrammatic illustration of an example message displayed on a user device.

A diagrammatic illustration of a conversation 400 displayed on user device 110 according to an embodiment of the present invention is illustrated in FIG. 4. By way of example, conversation 400 may include outgoing message 410 and response message 420. Outgoing message 410 may identify one or more recipients to which message 410 is directed, e.g., John, and may include one or more message contexts. For example, as shown in FIG. 4, message 410 may include a greeting to a recipient, e.g., "Hi John! How are you?" as well as one or more message contexts directed to the recipient, e.g., "How was the kayaking trip? Is Amy doing fine? I heard they are having a sale at the store, would you guys like to join?" Similarly, response message 420 may include one more responses associated with the one or more message contexts included in message 410. For example, as further shown in FIG. 4, response message 420 may include a greeting to a user associated with message 410, e.g., "Hey Beth. I am fine!," as well as one or more message contexts responding to the user, e.g., "Sure, lets go for the store this weekend. Amy is doing good? How is Paul?"

Initially, a user associated with user device 110 may pre-configure one or more user preferences related to the display of messages on user device 110. Based on the one or more user preferences, server 130 may determine not to partition an incoming message directed to the user and may forward an unmodified message to user device 110 for display to the user. Accordingly, as shown in FIG. 4, response message 420 may include contextual information that is not partitioned and is the same as, or substantially similar to, the original incoming message.

Figure 5:
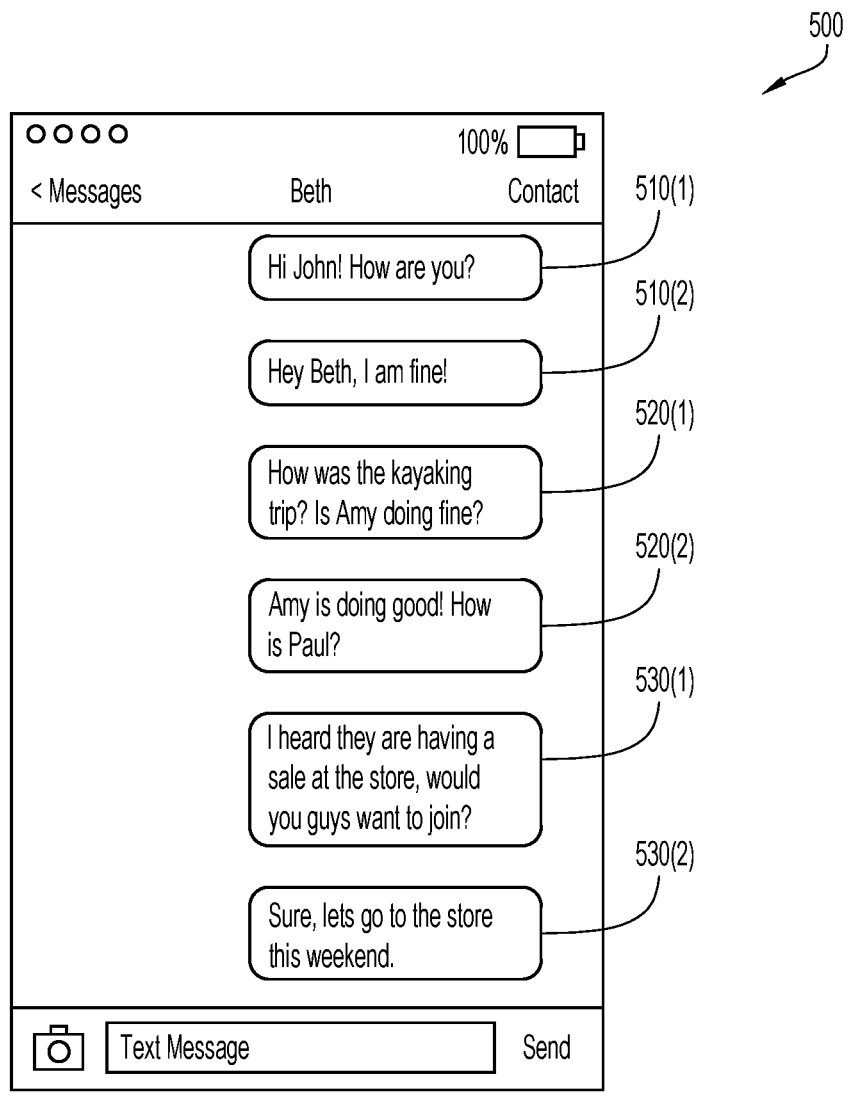
FIG. 5 is a diagrammatic illustration of an example processing of the message of FIG. 4 according to an embodiment of the present invention.

A diagrammatic illustration of a partitioned message 500 displayed on user device 110 according to an embodiment of the present invention is illustrated in FIG. 5. As discussed above, message context processor 140 may, using NLP techniques, analyze an incoming message to partition the incoming message into one or more distinct message threads based on one or more message contexts and/or one or more message sentiments identified in the incoming message. For example, as shown in FIG. 5, server 130 may partition message 500 into message threads 510, 520, and 530 based on a message context and/or sentiment associated with the messages comprising the one or more message contexts, e.g., 510(1), 510(2), 520(1), 520(2), 530(1) and 530(2).

By way of example, therefore, message 500 may include one or more message threads, e.g., 510, 520 and 530, each of which may comprise one or more contexts, e.g., 510(1), 510(2), 520(1), 520(2), 530(1), and 530(2). Accordingly, message thread 510 may comprise context 510(1) from a user associated with user device 110 to a recipient associated with the user, e.g., "Hi John! How are you?", and context 510(2) may be a response from the recipient to the user, e.g., "Hey Beth, I am fine!" Similarly, message thread 520 may comprise context 520(1), which may include a message from the user associated with user device 110 to a recipient associated with the user, and context 520(2), which may be a response to message 520(1) from the recipient to the user associated with user device 110. For example, as shown in FIG. 5, context 520(1) may be a question directed to the recipient, e.g., "How was the kayaking trip? Amy is doing fine?", and context 520(2) may include a response to context 520(1), e.g., "Amy is doing good! How is Paul?"

As further shown in FIG. 5, message 500 may also include message thread 530, which may comprise contexts 530(1) and 530(2). For example, context 530(1) may include an inquiry from a user associated user device 110, e.g., "I heard they are having a sale at the store, would you guys want to join?", and context 530(2) may be a response from a recipient associated with context 530(1), e.g., "Sure, let's go for the store this weekend."

According to an embodiment of the present invention, server 130 may group and display one or more messages associated with a message thread together to enable a user associated with user device 110 to visually identify the one or messages as being associated with each other. For example, as further shown in FIG. 5, server 130 may group and display context 510(1) with context 510(2). Similarly, server 130 may group and display context 520(1) with context 520(2) and context 530(1) with context 530(2). According to a further embodiment of the present invention, server 130 may display one or more contexts associated with a user, e.g., 510(1), 520(1), 530(1), differently (e.g., highlight, color, underline, capitalize, etc.) from one or more contexts associated with a recipient, e.g., 510(2), 520(2), 530(2), to enable a user associated with user device 110 to visually distinguish messages that were transmitted by the user from those messages that were received by the user.

Accordingly, using NLP techniques, message context processor 140 may analyze an incoming message to determine one or more message threads included in an incoming message and to display the one or more message threads in a manner enabling a user associated with user device 110 to readily identify the one or more message threads included in the incoming message. For example, based on one or more pre-configured preferences and/or parameters, server 130 may modify an incoming message by partitioning the incoming message into one or more message threads comprising one or more related contexts and displaying the one or more related contexts associated with each of the one or more message threads in close proximity on user device 110 to enable a user to identify each of the message threads and the related contexts associated with each of the message threads.

Figures 6A, 6B:
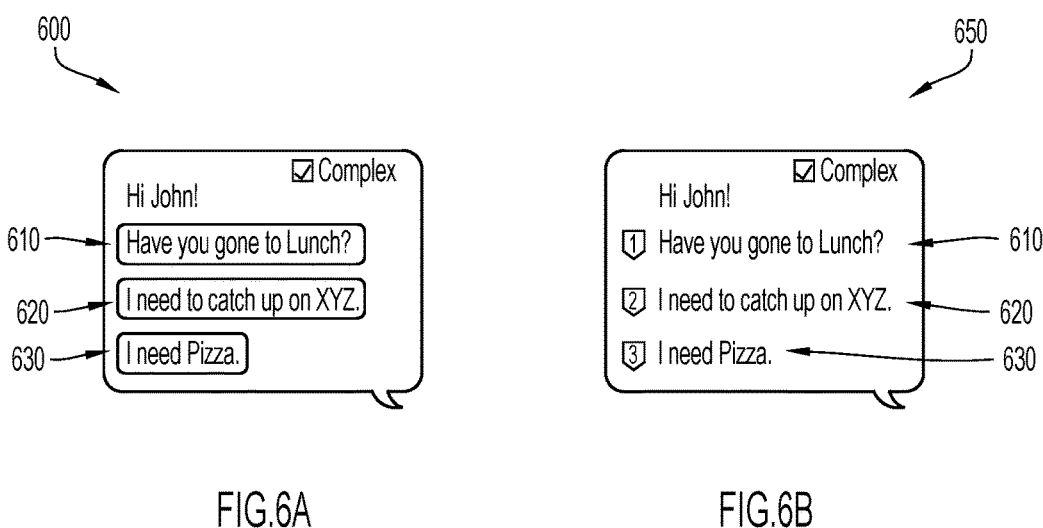
FIGS. 6A-B are diagrammatic illustrations of an example of threading a personal message displayed on a user device.

With reference to FIGS. 6A-B, there are depicted diagrammatic illustrations of both an incoming message 600 and a partitioned message 650 associated with incoming message 600 according to an embodiment of the present invention.

As discussed above, server 130 may analyze an incoming message, e.g., by using NLP techniques, to identify one or more contexts included in the incoming message. By way of example, server 130 may receive message 600 directed towards a user associated with user device 110 and analyze message 600 to identify context 610 (e.g., "Have you gone to lunch?"), context 620 (e.g., "I need to catch up on XYZ"), and context 630 (e.g., "I need Pizza.").

Server 130 may further analyze one or more contexts included in an incoming message to identify, based on a message content and/or sentiment associated with each of the one or more contexts, one or message threads included in the incoming message. For example, as shown in FIG. 6B, server 130 may analyze contexts 610, 620 and 630 to determine that context 610 is related to context 630 and, accordingly, identify that contexts 610 and 630 belong to the same message thread, e.g., thread 1. Similarly, server 130 may analyze contexts 610, 620 and 630 and determine that context 620 is not related to context 610 or context 630 and, as such, determine that context 620 belongs to a different message thread, e.g., thread 2.

Figure 7:
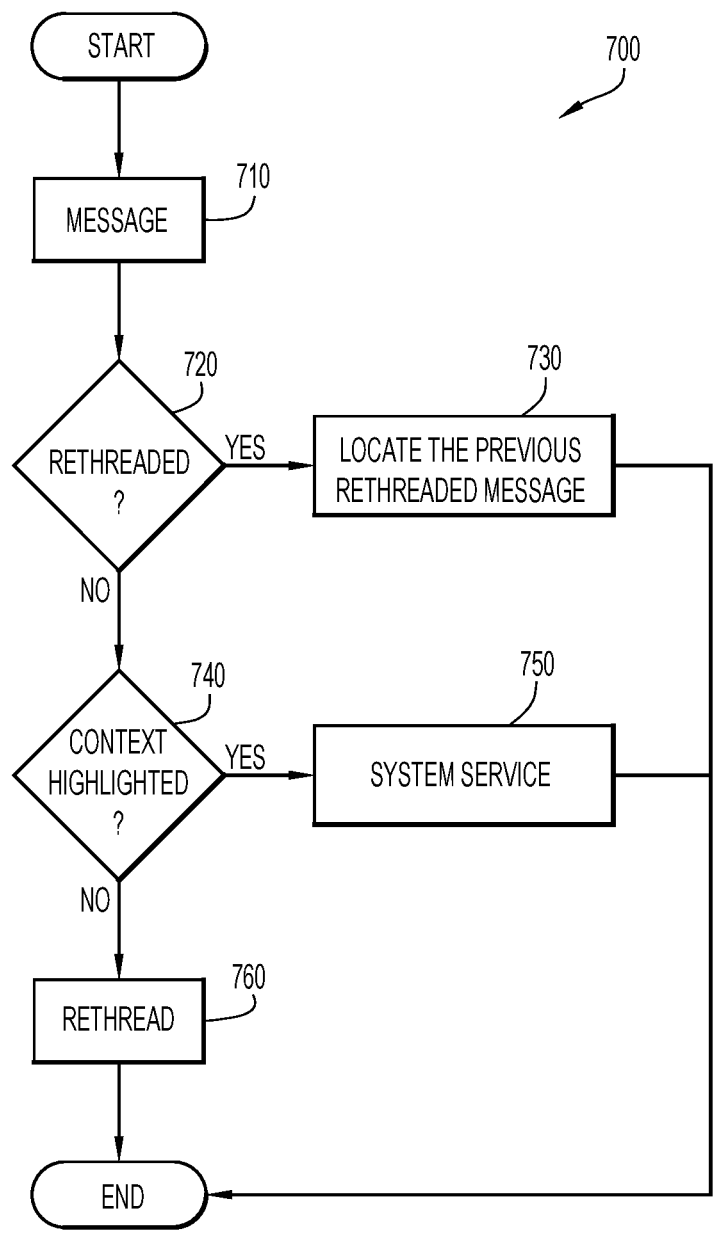
FIG. 7 is a flow chart illustrating a manner in which an incoming message is threaded according to an embodiment of the present invention.

With reference to FIG. 7, there is depicted a procedural flow chart illustrating a method 700 to partition an incoming message into one or more message threads based on one or more message contexts and/or sentiments included in the incoming message. Method 700 is performed primarily by message thread manager 230.

In accordance with method 700, user profile database 285 may be preconfigured with one or more user preferences. For example, the user profile information stored in user profile database 285 may include whether the user has requested or enabled message partition operations on server 130, whether the user has indicated that only high-priority messages should be partitioned, whether server 130 should highlight messages included in a message thread to indicate whether they are incoming or outgoing messages, etc.

Initially, server 130 receives a message directed to a user associated with user device 110 at step 710, and determines whether the message has been previously partitioned into one or more message threads at step 720.

When the message has been previously partitioned, server 130 locates the previously rethreaded message from memory 220 and forwards the previously rethreaded message to user device 110 for display to a user at step 730, and method 700 ends.

When the message has not been previously partitioned, server 130 retrieves user profile information from user profile database 285 to determine whether the user has enabled message partitioning operations at step 740.

When the user has not enabled message partitioning operations, server 130 forwards the incoming message without modification to user device 110 at step 750, and method 700 ends.

When the user has enabled message partitioning operations, server 130 partitions the incoming message into one or more message threads based on one or more message contexts and/or sentiments included in the message at step 760, and method 700 ends.

Figure 8:
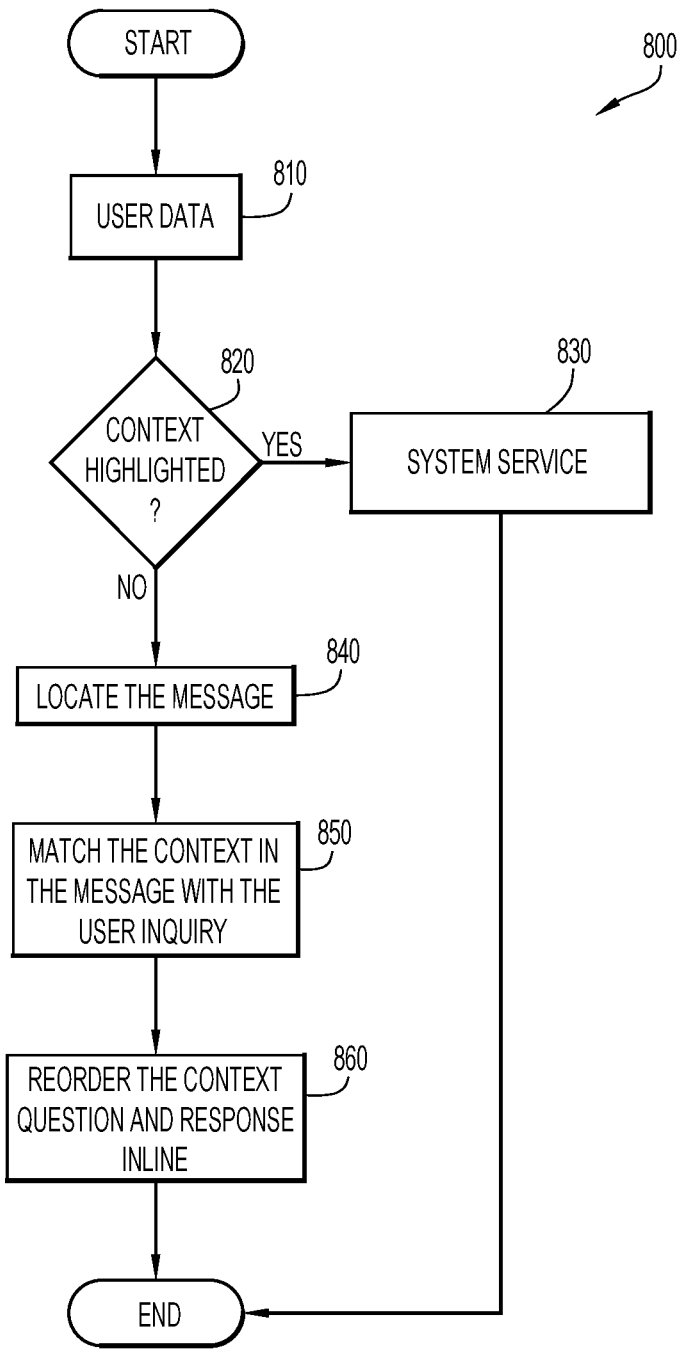
FIG. 8 is a procedural flow chart illustrating a manner in which an incoming message is threaded by aligning one or more user inquiries with one or more associated replies according to an embodiment of the present invention.

With reference to FIG. 8, there is depicted a procedural flow chart illustrating a method 800 in which a message is partitioned by associating one or more questions with one or more related responses. Method 800 is performed primarily by message thread manager 230.

Initially, server 130 receives an incoming message and retrieves user profile information from user profile database 285 at step 810.

Server 130 determines whether the user has enabled message partitioning operations at step 820.

When the user has not enabled message partitioning operations, server 130 forwards the incoming message to user device 110 at step 830, and method 800 ends.

When the user has enabled message partitioning operations, server 130 locates and retrieves the message from memory 220 at step 840.

Server 130 analyzes the message to identify one or more message contexts included in the message and correlates the one or more message contexts with one or more inquiries sent by a user associated with user device 110 at step 850.

For each of the one or more message contexts, server 130 reorders the message contexts to be grouped together with an inquiry provided by the user related to the message context at step 860, and method 800 ends.

Figure 9:
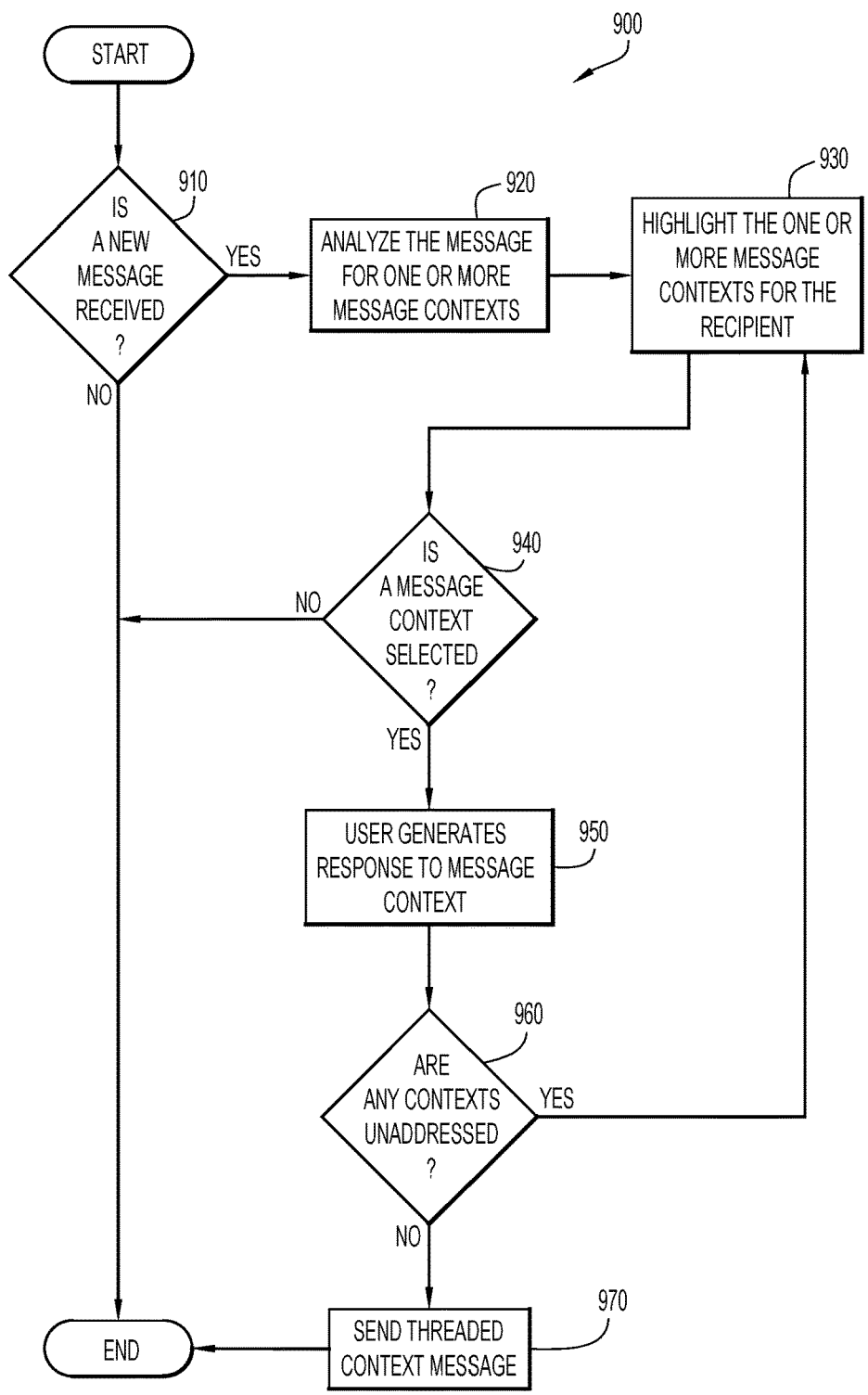
FIG. 9 is a procedural flow chart illustrating a manner in which an incoming message is threaded with one or more user responses according to an embodiment of the present invention.

With reference to FIG. 9, there is depicted a procedural flow chart illustrating a method 900 in which a message is highlighted based on one or more message contexts to enable a user to generate a response to the one or more message contexts.

In accordance with method 900, memory 220 may store, e.g., in user profile database 285, one or more messages and/or message data comprising one or more contexts related to an incoming message directed to a user associated with user device 110. Method 900 is performed primarily by message thread manager 230.

At step 910, initially, server 130 may receive an incoming message directed to a user associated with user device 110.

At step 920, context analyzer 240 may, using NLP techniques, analyze the incoming message to identify one or more message contexts associated with one or more message threads. According to an embodiment of the present invention, the incoming message may comprise one or more message contexts and/or data directed to the user.

At step 930, server 130 may highlight the one or message contexts to enable a user associated with user device 110 to distinguish and respond to the one or more message contexts.

At step 940, message thread manager 230 determines whether the user has selected at least one highlighted message context.

When the user has not selected at least one highlighted message context, method 900 ends.

At step 950, when the user has selected at least one highlighted message context, the user generates a response to the at least one highlighted message context.

At step 960, message thread manager 230 determines whether the user has responded to the one or more message contexts included in the incoming message.

When the user has not responded to the one or more message contexts included in the incoming message, message thread manager 230 highlights one or more message contexts for display on user device 110, at step 930.

At step 970, when the user has responded to the one or more message contexts included in the incoming message, server 130 sends the threaded message comprising the one or more contexts and the associated one or more responses to user device 110 for display to the user, and method 900 ends.

Advantages of the present invention embodiments include dynamically intercepting and partitioning messages to mobile phones and/or smartphones that are transmitted over cellular networks (e.g., text messages, chat room conversations, notifications, etc.). It should be understood that the system is not limited to cellular communications and may further dynamically intercept and partition any number of electronic communications (e.g., social network posts, e-mails, blogs, etc.).

It will be appreciated that the embodiments described above and illustrated in the drawings represent only a few of the many ways of implementing embodiments for dynamic message partitioning based on message content and user context.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.).

The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., message thread manager, context analyzer, sentiment analyzer, partitioning engine, etc.). These systems may include any types of monitors and input devices (e.g., keyboard, mouse, voice recognition, etc.) to enter and/or view information.

It is to be understood that the software (e.g., message thread manager, context analyzer, sentiment analyzer, partitioning engine, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., message thread manager, context analyzer, sentiment analyzer, partitioning engine, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store messages, message-related data, user preferences and/or characteristics and one or more environmental parameters (e.g., user device configuration settings, network attributes, etc.). The database system may be implemented by any number of any conventional or other databases, data stores or storage structures (e.g., files, databases, data structures, data or other repositories, etc.) to store information (e.g., user device configuration settings, public/private location, network attributes, etc.). The database system may be included within or coupled to the server and/or client systems. The database systems and/or storage structures may be remote from or local to the computer or other processing systems, and may store any desired data (e.g., user device configuration settings, network attributes, etc.).

The present invention embodiments may employ any number of any type of user interface (e.g., Graphical User Interface (GUI), command-line, prompt, etc.) for obtaining or providing information (e.g., messages, analytics, configurations, user or other preferences, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion. The report may include any information arranged in any fashion, and may be configurable based on rules or other criteria to provide desired information to a user (e.g., user device configuration settings, public/private location, network attributes, etc.).

The present invention embodiments are not limited to the specific tasks or algorithms described above, but may be utilized for any type of messages (e.g., personal, business, legal, financial, etc.) to perform any type of message partitioning on any type of message modification device (e.g., computer, laptop, smartphone, server, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of dynamically processing incoming messages comprising:
    specifying, via a processor, a priority level for messages to be partitioned;
    receiving, via the processor, a message including a plurality of different contexts within a first thread from a first user device;
    determining, via the processor, the priority level of the message; and
    in response to the determined priority level of the message satisfying the specified priority level:
        partitioning, via the processor, the message from the first thread into a plurality of second threads, wherein each second thread is associated with a corresponding context, and wherein each context includes an inquiry to receive a reply;
        receiving, via the processor, one or more replies for a corresponding context from a second user device;
        generating, via the processor, a response to the message including the one or more replies, wherein each reply is inserted into a second thread associated with the corresponding context; and
        transmitting the response to the first user device in the plurality of threads, via the processor, in response to the message.

2. The method of claim 1, wherein partitioning the message comprises:
    highlighting selected contexts for reply to the inquiries.

3. The method of claim 1, further comprising:
    transmitting the response when replies are generated for each context.

4. The method of claim 1, further comprising:
    highlighting the one or more replies to the inquiries of the contexts using color-coding.

5. The method of claim 1, further comprising:
    re-partitioning the message including the response based on one or more additional replies for the contexts.

6. The method of claim 1, wherein the message is partitioned employing Natural Language Processing (NLP) techniques to detect the contexts.

7. The method of claim 1, further comprising:
    displaying each of the one or more replies with a related inquiry to receive the reply.

8. A system for dynamically processing incoming messages comprising:
    at least one processor configured to:
        specify a priority level for messages to be partitioned;
        receive a message including a plurality of different contexts within a first thread from a first user device;
        determine the priority level of the message; and
        in response to the determined priority level of the message satisfying the specified priority level:
            partition the message from the first thread into a plurality of second threads, wherein each second thread is associated with a corresponding context, and wherein each context includes an inquiry to receive a reply;
            receive one or more replies for a corresponding context from a second user device;
            generate a response to the message including the one or more replies, wherein each reply is inserted into a second thread associated with the corresponding context; and
            transmit the response to the first user device in the plurality of threads in response to the message.

9. The system of claim 8, wherein partitioning the message comprises:
    highlighting selected contexts for reply to the inquiries.

10. The system of claim 8, wherein the at least one processor is further configured to:
    transmit the response when replies are generated for each context.

11. The system of claim 8, wherein the at least one processor is further configured to:
    highlight the one or more replies to the inquiries of the contexts using color-coding.

12. The system of claim 8, wherein the at least one processor is further configured to:
    re-partition the message including the response based on one or more additional replies for the contexts.

13. The system of claim 8, wherein the message is partitioned employing Natural Language Processing (NLP) techniques to detect the contexts.

14. The system of claim 8, wherein the at least one processor is further configured to:
    enable displaying of each of the one or more replies with a related inquiry to receive the reply.

15. A computer program product for dynamically processing incoming messages comprising:

a computer readable storage medium having program instructions embodied therewith, the program instructions executable by at least one processor to cause the at least one processor to:
specify a priority level for messages to be partitioned;
receive a message including a plurality of different contexts within a first thread from a first user device;
determine the priority level of the message; and
in response to the determined priority level of the message satisfying the specified priority level:
  partition the message from the first thread into a plurality of second threads, wherein each second thread is associated with a corresponding context, and wherein each context includes an inquiry to receive a reply;
  receive one or more replies for a corresponding context from a second user device;
  generate a response to the message including the one or more replies, wherein each reply is inserted into a second thread associated with the corresponding context; and
  transmit the response to the first user device in the plurality of threads in response to the message.

16. The computer program product of claim 15, wherein partitioning the message comprises:
highlighting selected contexts for reply to the inquiries.

17. The computer program product of claim 15, wherein the program instructions are further configured to:
transmit the response when replies are generated for each context.

18. The computer program product of claim 15, wherein the program instructions are further configured to:
highlight the one or more replies to the inquiries of the contexts using color-coding.

19. The computer program product of claim 15, wherein the program instructions are further configured to:
re-partition the message including the response based on one or more additional replies for the contexts.

20. The computer program product of claim 15, wherein the message is partitioned employing Natural Language Processing (NLP) techniques to detect the contexts.

* * * * *